(12) United States Patent
Horn et al.

(10) Patent No.: US 7,117,049 B2
(45) Date of Patent: Oct. 3, 2006

(54) INDUSTRIAL CONTROLLER BASED ON DISTRIBUTABLE TECHNOLOGY OBJECTS

(75) Inventors: Wolfgang Horn, Hohenstein-Ernstthal (DE); Thomas Ackermann, Herzogenaurach (DE); Johannes Birzer, Stulln (DE)

(73) Assignee: Siemens Aktlencesellschaft, Munich (DE)

( * ) Notice: Subject to any disclaimer, the term of this patent is extended or adjusted under 35 U.S.C. 154(b) by 228 days.

(21) Appl. No.: 09/896,776

(22) Filed: Jun. 29, 2001

(65) Prior Publication Data

US 2002/0049959 A1 Apr. 25, 2002

(30) Foreign Application Priority Data

| Aug. 3, 2000 | (DE) | 100 37 971 |
| Aug. 3, 2000 | (DE) | 100 37 990 |
| Nov. 8, 2000 | (DE) | 100 55 168 |
| Nov. 8, 2000 | (DE) | 100 55 169 |

(51) Int. Cl.
*G05B 15/00* (2006.01)
*G06F 9/44* (2006.01)

(52) U.S. Cl. ............... 700/83; 700/2; 700/19; 700/20; 717/165

(58) Field of Classification Search .......... 700/2, 700/19, 20, 83; 717/162, 165, 107
See application file for complete search history.

(56) References Cited

U.S. PATENT DOCUMENTS

| 5,452,201 A * | 9/1995 | Pieronek et al. ............ 700/83 |
| 5,453,933 A | 9/1995 | Wright et al. |
| 5,485,400 A * | 1/1996 | Warrior et al. ............ 700/67 |
| 5,485,620 A * | 1/1996 | Sadre et al. ............ 717/162 |
| 5,485,626 A | 1/1996 | Lawlor et al. |
| 5,576,946 A | 11/1996 | Bender et al. |
| 5,611,059 A * | 3/1997 | Benton et al. ............ 715/734 |
| 5,805,442 A * | 9/1998 | Crater et al. ............ 700/9 |
| 5,841,654 A * | 11/1998 | Verissimo et al. ............ 700/83 |
| 5,844,804 A | 12/1998 | Schussler et al. |
| 6,144,993 A | 11/2000 | Fukunaga et al. |
| 6,263,487 B1 | 7/2001 | Stripf et al. |
| 6,282,455 B1 * | 8/2001 | Engdahl ............ 700/83 |
| 6,327,628 B1 | 12/2001 | Anuff et al. |
| 6,424,872 B1 * | 7/2002 | Glanzer et al. ............ 700/18 |
| 6,539,268 B1 | 3/2003 | Wucherer et al. |
| 6,571,273 B1 | 5/2003 | Shirai et al. |
| 6,594,541 B1 | 7/2003 | Heber et al. |
| 6,600,964 B1 | 7/2003 | Hess et al. |

(Continued)

FOREIGN PATENT DOCUMENTS

DE 197 40 550 A1 4/1998

(Continued)

OTHER PUBLICATIONS

Object-Oriented Software Components and Containers, Process/Industrial Instruments and Controls Handbook, pp. 3.24-3.25, 1999.

(Continued)

*Primary Examiner*—Thomas Pham
(74) *Attorney, Agent, or Firm*—White & Case LLP

(57) ABSTRACT

The loadability of technology object types into a run time system of an industrial controller permits functional expansion of the basic system of the controller as well as technological scaling of the controller. The loaded technology object types are instantiable, and may be distributed, as needed. Technology object types may be loaded in the form of technology packages and a user may use the functionality of the invention directly in a user program with a separation between technological functionality and device functionality.

17 Claims, 11 Drawing Sheets

U.S. PATENT DOCUMENTS 6,912,442 B1 6/2005 Heber et al.
6,950,715 B1 9/2005 Wucherer

FOREIGN PATENT DOCUMENTS

DE 198 53 205 A1 6/2000
EP 852759 B1 3/2002

OTHER PUBLICATIONS

Controllers, Process/Industrial Instruments and Controls Handbook, pp. 3.43-3.45, 1999.
Function Blocks Defined by Foundation Fieldbus Specification, Process/Industrial Instruments and Controls Handbook, p. 11.23, 1999.
U.S. Appl. No. 10/181,204, filed Jul. 10, 2002, Wucherer et al.
U.S. Appl. No. 10/181,205, filed Jul. 10, 2002, Wucherer et al.
Search Report issued in related German Application No. DE 100 55 169.9 and its translation.
Search Report issued in related German Application No. DE 100 55 168.8 and its translation.
English language Abstract to German Patent No. DE 197 40 550 A1.
Seki, T. et al.: "Decentralized Autonomous Object-oriented EMS/SCADA System"; 3rd ISADS, Apr. 9-11, 1997, pp. 395-402.
Jasper, W. J. et al.: "Real-time System for Data Acquisition and Control of Batch Dyeing"; IEEE Annual textile, May 1994, pp. 1-5.
Lafont, J. C. et al.: "Modelling and a Design of a Production Automated System Using a Decisional Object Oriented Method 'MACSOOD'"; Proceedings CompEuro 1993, May 24-27, 1993, pp. 282-287.
Hasan, K., et al.: "An Object-oriented Expert System for Power System Alarm Processing and Fault Identification"; 7th Mediterranean Electrotechnical Conference, Apr. 12-14, 1994, pp. 909-912.
Brooke, D. W. I., "Software Tools for Small Scale Process Controllers Using a Real-time Rule Interpreter and Object-oriented Technique"; ICC, bd. 1, Mar. 25-28, 1991, pp. 306-310.
Smith, L. S. et al.: "Object-oriented Modelling and Control"; IEE Colloquium, Mar. 5, 1991, pp. 2/1-2/3.
Coote, S. et al.: "Graphical and Iconic Programming Languages for Distributed Process Control: An Object Oriented Approach"; IEEE Workshop, Oct. 10-12, 1998, pp. 183-190.

* cited by examiner

INDUSTRIAL CONTROLLER BASED ON DISTRIBUTABLE TECHNOLOGY OBJECTS

FIELD OF THE INVENTION

The present invention relates to an industrial controller for technical processes, in particular for production machines.

Furthermore, the present invention relates to a method of programming and designing industrial controllers for technical processes, in particular for production machines.

BACKGROUND

An industrial controller may be a separate device or it may be integrated into a computer, a PC, a stand-alone unit or a drive.

Prior industrial controllers for automation of technical processes have been based essentially either on a programmable controller functionality, a motion control ("MC") functionality or a technology functionality. Since a certain scope of function is stipulated as part of such functionalities, optimal adaptation to the requirements of a special process is limited. An entire group of functions is often superfluous in a specific application (e.g., when using an MC controller for machine tools, any functionality that might be provided for packaging machines would be superfluous).

German Patent 197 40 550 also describes a device that executes a control program for controlling a technical process and/or controlling the motion of a processing machine. This control program comprises a plurality of software modules. Process control functionalities of known programmable controllers, and motion functionalities of known MC controllers, are implemented in a uniform configurable control system. However, individual software modules here are executed by a partial subgroup control so that a central processing unit is to be provided for each software module.

In addition, German Patent 198 53 205 discloses a method of controlling technical processes where the method is based on instantiability and interleaving of software components with a preselectable functionality, which is at least parameterizable. However, the interleaving and design of the software components are not optimized.

SUMMARY OF THE INVENTION

Therefore, an object of the present invention is to create optimal features of an industrial controller with regard to its control structure, as well as its functionality, for different control tasks, different boundary conditions and requirements of the underlying technical processes in a simple manner.

The inventors have based this on the finding that the run time system and/or engineering system of the industrial controller uses both programmable controller functionality as well as motion and/or technology functionality. The opportunity for dynamic loading of function code into the run time system and/or the engineering system of the industrial controller, (i.e., scaling of the controller) permits the design and development of the controller to be facilitated by a separation of technological functionality and device functionality.

An object of the present invention is achieved for an industrial controller with a generally usable, preferably technology-neutral, basic system for the basic functionality of the controller. Instantiable types of technology objects supplement the basic functionality of the controller by adding technological functionalities and being available as technology objects in its respective applications after instantiation tailored to the needs of the given user. Therefore, there is a separation between technological functionality and device functionality.

A technology object preferably represents a component of the real world. In the context of industrial controllers, these may be, for example, components of machine tools or production machines. Technology objects provide a defined, closed technological functionality. They may be interleaved with one another to implement technological tasks. Because the technological functionality of the controller is formed by technology objects, which are preferably real components, the technological capability (i.e., the power of the controller) becomes immediately transparent to a user of the controller. A technology object can also very easily be reused by the user as a software technological unit in different applications and controllers. In using technology objects, a user can abstract objects from their implementation. Technology objects that are directly usable by the user in his user program are formed by their instantiation from technology object types. Any desired number of instances (tailored to the user) of technology objects can be obtained from a technology object type once it has been defined. Because the instantiation can take place in the engineering system or in the run time system, it is readily convenient and easy for the user to use the technology objects in his applications. The functional depth of a controller can, thus, be expanded very easily. This expandability is limited only by hardware restrictions (e.g., CPU, power or memory restrictions).

In addition, the user has the option of expanding the existing basic system for the basic functionality of the controller by adding those functionalities actually needed by the user for his applications. This is because the user explicitly loads certain required technology objects into the basic system of the controller. A user can, thus, individually acquire a controller having a certain functionality. Unneeded functionalities usually present in controllers are, thus, avoided and do not cause any overhead.

Another advantage is the separation of technological functionality and device functionality. Technology objects are abstracted from the devices on which the technology objects are running. Thus, the allocation of a technology object to a device can be altered very easily, and program generation (i.e., use of the technology objects in the user programs) can take place independently of the devices. Thus, the devices themselves are only the running environment for the technology objects. The user can choose which technology objects to allocate to devices in whatever manner is best for him. Optimization criteria may include, for example, utilization of capacity, spatial distribution and bus length.

In addition, another advantage consists in the development and production of such scalable controllers. Controllers that are supplied with a required basic functionality (a basic system) can be produced very easily in large numbers (yielding economies of scale).

A first advantageous embodiment of this invention consists in the fact that automatic generation and design of communications links between technology objects based on the underlying hardware topology and/or the technological solution are possible. In the engineering system, information on technology objects is allocated to devices and network topology. Quality of service requirements and data volume are analyzed, and automatic design of the communication channels is generated from this information. This feature facilitates program generation for the user.

Another advantageous embodiment of this invention consists in the fact that, in automatic generation and design of the communications links between technology objects, quality attributes acquired by or allocated to the technology objects are taken into account. This automatic communications design permits efficient utilization of the device and network topology used, because abstract "quality of service" requirements (such as broadcast, clock synchronicity or transmission time) are imaged optimally on the device and bus properties.

In another embodiment of the claimed invention, the engineering system, the allocation information of technology objects to devices, the device and network topology as well as the quality of service requirements and data volume are analyzed, and the automatic design of the communication channels is generated from this data.

Another advantageous embodiment of this invention lies in the flexible relocatability and/or distributability of the technology objects on run time systems and/or hardware systems of the same or different performance level. Technology objects do not depend on hardware or platform. They do not contain any hardware-specific or platform-specific properties and, thus, they can be loaded very easily onto different hardware systems and/or run time system, and relocated and distributed thereon. The possibility of the relocatability and distributability of the technology objects on hardware systems of the same or different performance level allows a user to use technology objects in a very flexible manner and not be concerned with restrictions regarding the basic performance of the hardware systems and/or run time systems in the relocation and distribution of the technology objects. In addition, the load in a system can be distributed and balanced flexibly due to the relocation and distribution of the technology objects.

In another embodiment of the claimed invention, flexible relocatability and/or distributability of the technology objects on hardware and/or run time systems of the same or different performance level is possible within a project, with a project being based on data and/or programs from one or more control units. Within a project, a user thus has the option of using devices of different hardware. These devices may also have different performance levels, and the technology objects can be distributed easily and flexibly to these devices without having to take into account the performance differences between the devices.

Another advantageous embodiment of the basic invention consists in the fact that the functionality of the technology objects is distributed among control units in equidistant communication with one another in real time with clock synchronization. The technology objects can, thus, be distributed to devices and control units, which are connected by a communications medium that allows a clock-synchronized equidistant communication. Thus, the technology objects can communicate with one another in real time. In one project, the instances of technology object types can be referenced unambiguously and can be used in a manner that goes beyond the given (hardware) platform.

Another advantageous embodiment of the present invention consists in the fact that technological scaling (with regard to the functionality of the controller) takes place through the loadability of technology object types. The user, thus, has the option of achieving a functional scaling of his controller. Therefore, a user can very easily adapt the functionality of his controller to the basic and given needs and boundary conditions. Expandability is based on both device functionality and technological functionality.

Another advantageous embodiment of the present invention consists in the fact that the technology objects are interleaved to form complex technology objects, so-called container objects. Therefore, the user has the option of creating complex technology objects from "simple" technology objects. Said complex technology objects represent a higher-level or more complex technological functionality in comparison with the "simple" technology objects. The interleaving takes place through hierarchical relationships between the technology objects and/or data flow relationships.

Another advantageous embodiment of the present invention consists in the fact that different views of the technology objects may be available to a user. The abstraction mechanisms provided by the technology objects permit different views of the objects (depending on the application phase or type of user). For example, from the engineering system there is a project view (usually in the form of a tree diagram) and/or a start-up view (e.g., for setting up and configuring the instances). However, a technical programming view is also available. In this view, for example, methods and attributes of the technology objects are made available to the user. From an ergonomic viewpoint, the views are made available to a user in the form of graphical elements, e.g., as icons or masks.

Another advantageous embodiment of the present invention consists in feedback-free programming of a technology object with respect to the other technology objects present and the basic system of the controller, unless feedback is explicitly programmed or designed. The user can thus program the behavior of a technology object independently of feedback from other technology objects or the basic system of the controller. However, he may explicitly program or design a feedback procedure if necessary or desired. This greatly increases the user's flexibility in programming technology objects.

Another advantageous embodiment of the present invention consists in the fact that the technology objects are represented as graphical elements and/or masks in the engineering system. The use of graphical elements supports the user in using the technology objects. This greatly increases the productivity and quality of the design and programming.

Another advantageous embodiment of the present invention consists in the fact that the technology object types are combined into technology packages. Technology packages represent clustering of technology object types that belong together functionally or technologically. Controllers with a dedicated function scope can be obtained by loading technology packages onto the basic system of a controller. Such controllers have little functional overhead. Due to the clustering and allocation of technology object types to form technology packages, first, structuring and classification are achieved, and secondly, the technology packages are a suitable means for loading the technology object types onto the run time system of a controller.

According to the present invention, the object defined above is achieved for a method of the type defined above comprising the following successive steps:

a) use of a basic system having a basic functionality, preferably technology-neutral,
b) instantiation of the technology objects,
c) interleaving of the technology objects to form technology objects of a complex functionality,
d) distribution and/or placement of the technology objects in the devices,
e) automatic generation of the communication channels between the technology objects, f) reuse of, in particular, complex technology objects, already interleaved, in other projects.

Therefore, the user has the opportunity to achieve the functionality of a desired controller in a systematic and consistent manner, ensuring that the resulting controller entails virtually no functional overhead. Another advantage is that, in creating user programs, a user can use the technology objects independently of the hardware and the devices on which they will ultimately run. Only after instantiation and interleaving of the technology objects are the objects distributed to the hardware and devices. The allocation to the devices may be changed at any time. Thus, there is a strict separation of technological functionality and device functionality. The technological functionality of the technology objects does not depend on the device functionality, i.e., on the devices on which they run. The devices themselves represent only the run environment for the technology objects. Therefore, technology objects (simple and/or complex and/or interleaved) can be reused very easily in other projects. Automatic generation of communication channels between the technology objects (automatic communications design) permits efficient utilization of the instrument and network topology used and supports the user in design and program development.

Another advantageous embodiment of the present invention, consists in the fact that in generation of the communication channels, quality attributes of the technology objects are maintained. The device and network topology is utilized even more efficiently due to the fact that quality requirements that can be preselected by the user (e.g., transmission time, clock synchronicity, broadcast) are taken into account, and the user need only specify quality attributes as input for the automatic generation of communication channels in designing and programming the communication channels.

Another advantageous embodiment of the present claimed invention consists in the fact that steps b) and e) of the above-mentioned process are optional. User flexibility is increased because technology objects need not necessarily be interleaved and/or reused in other projects.

The essential advantages that can be achieved with the present invention, thus, consist in particular of the fact that a user can use directly in his applications a technological functionality made adequately available to him through technology objects corresponding to elements of the real world. For a user, there is a strict separation of technological functionality and device functionality. Devices are only the execution environment for technology objects. The technological functionality of the technology objects does not depend on the device functionality.

Another advantage is that the functionality of industrial controller can be expanded in a dedicated manner by the so-called plug-and-play system, permitting technological scaling of the controller.

BRIEF DESCRIPTION OF THE FIGURES

An embodiment of the present invention is explained in greater detail below and illustrated in the drawings as follows.

DETAILED DESCRIPTION OF THE INVENTION

Figure 1:
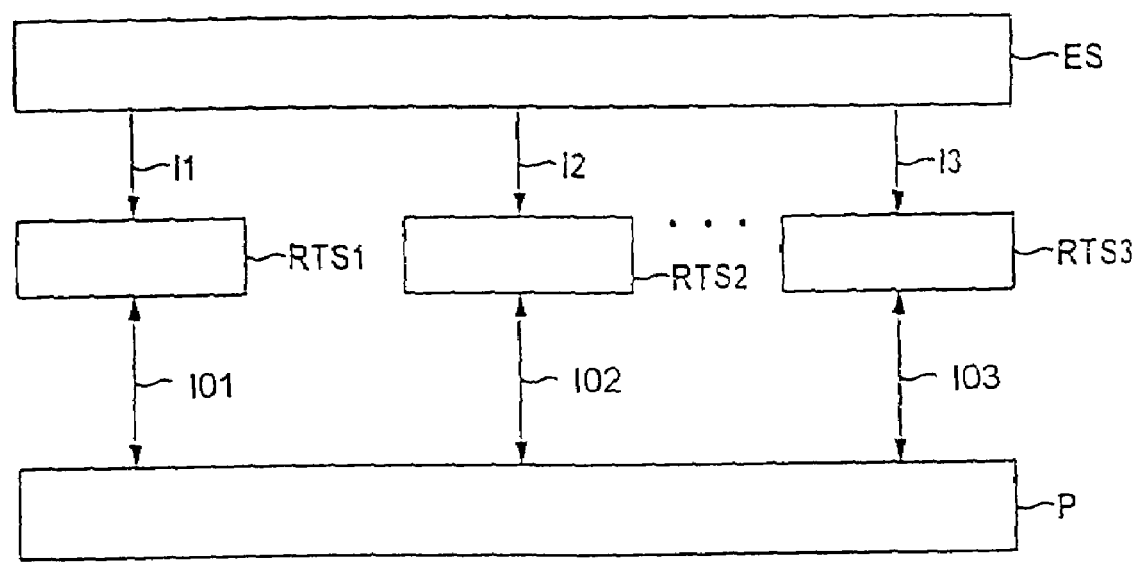
FIG. 1 uses a block diagram to show an engineering system, the respective run time system and the technical process to be controlled.

FIG. 1 uses a block diagram to show that a technical process P may be controlled over at least one run time system RTS1–RTS3 of an industrial controller. The connection between the run time systems RTS1–RTS3 of the controller and the technical process P is bidirectional over inputs/outputs IO1–IO3. The controller is programmed and, thus, the performance of the run time systems RTS1–RTS3 is stipulated in the engineering system ES. Engineering system ES contains tools for configuration, design and programming for machines and for controllers of technical processes. Programs generated in the engineering system ES are transmitted over information paths I1–I3 to the run time systems RTS1–RTS3 of the controllers. The three dots between RTS2 and RTS3 indicate that additional controllers and run time systems may be present. With regard to its hardware equipment, an engineering system ES may comprise a computer system with a graphic display screen (e.g., a display), input means (e.g., keyboard and mouse), processor, working memory and secondary memory, a device for recording computer-readable media (e.g., diskettes, CDs) and terminal units for data exchange with other systems (e.g., other computer systems, other controllers for technical processes) or media (e.g., the Internet). A controller usually consists of input or output units, a processor, and program memory.

Figure 2:
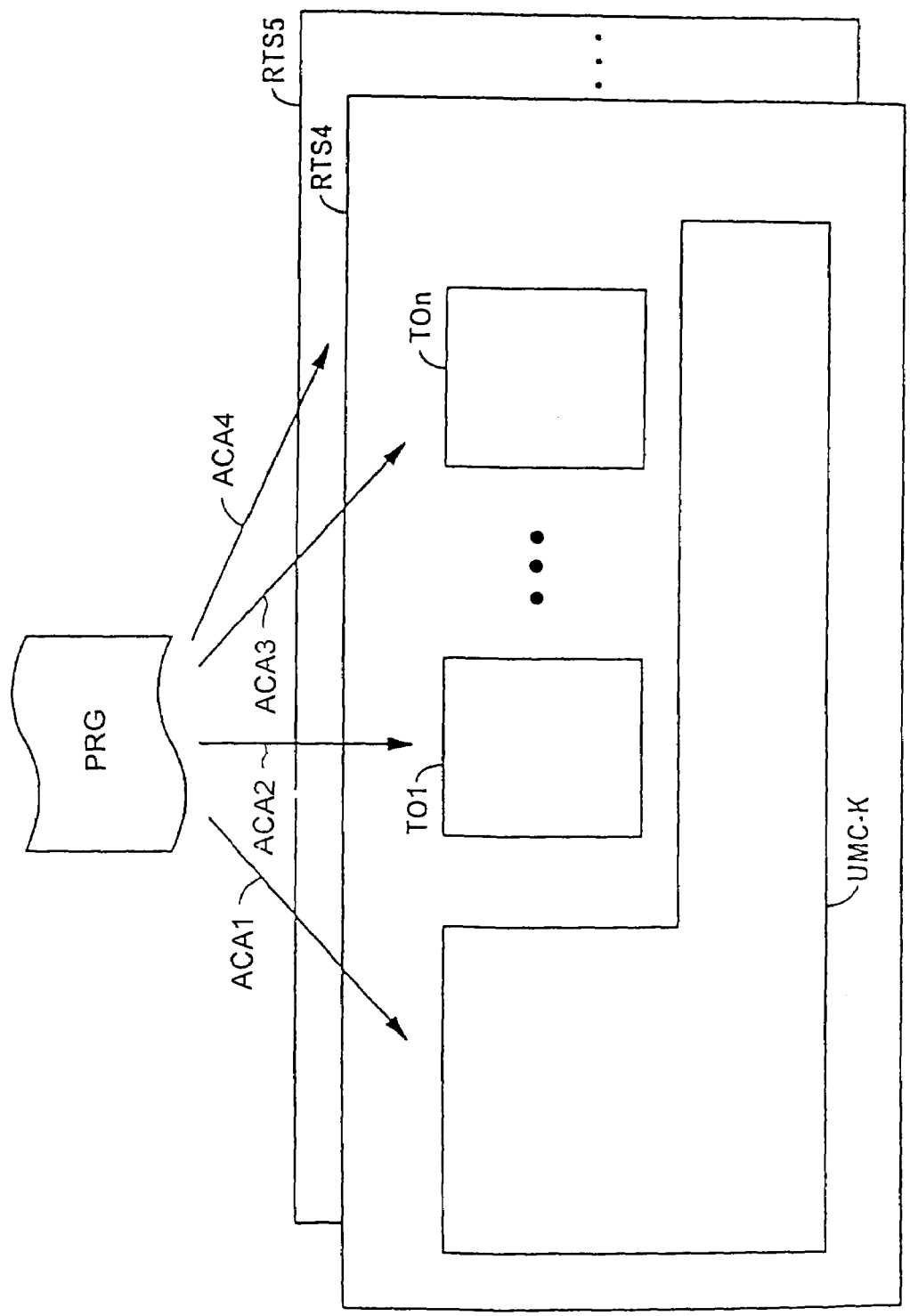
FIG. 2 uses a diagram to show how a user program accesses a technological functionality in the run time system.

FIG. 2 shows two run time systems RTS4 and RTS5 of industrial controllers, represented as a rectangle. Run time systems RTS4 and RTS5 each contain a universal motion control kernel UMC-K and technology objects TO1 through TOn. The respective UMC kernels as well as the technology objects may be different, and the technology objects may also differ in number. The UMC kernel UMC-K is the basic system of the controller; this system contains the basic functionality of the controller. The UMC kernel UMC-K is shown in a rectangular step form. Technology objects TO1 through TOn can be loaded into the UMC-K kernel. Through this additional installation, the scope of function of the basic system is expanded. Technology objects TO1 through TOn are shown as rectangles; their arrangement in FIG. 2 indicates that they expand the UMC kernel UMC-K. The three dots between TO1 and TOn indicate that one or more technology objects TO1 through TOn may be loaded in the kernel This arrangement thus yields technological scaling of the entire controller. User program PRG1 is shown at the top center of FIG. 2 in the shape of a flag. Access arrows ACA1 through ACA4 indicate that in his user program PRG1 a user can directly access functionalities of the UMC kernel UMC-K and can also access functionalities of technology objects TO1 through TOn, from RTS4 or RTS5, or from another run time system (likewise indicated by three dots). A user can use these functionalities of run time systems RTS4 and RTS5 which are supplied (or of other run time systems) directly in his application program PRG1.

More precisely, to expand the basic system of a run time system, technology objects are usually loaded in the form of technology object types. Such technology object types include, for examples, axles, cams, cam plates and the like. Technology object types are instantiable. In his application program PRG1, a user can use instances of technology object types for concrete applications. Such instances are then defined unambiguously and are identifiable throughout a project. Direct use of technology objects additionally loaded in user program PRG1 as independent program objects would also be possible in principle, but such direct use would not be flexible for a user generating a program.

Figure 3:
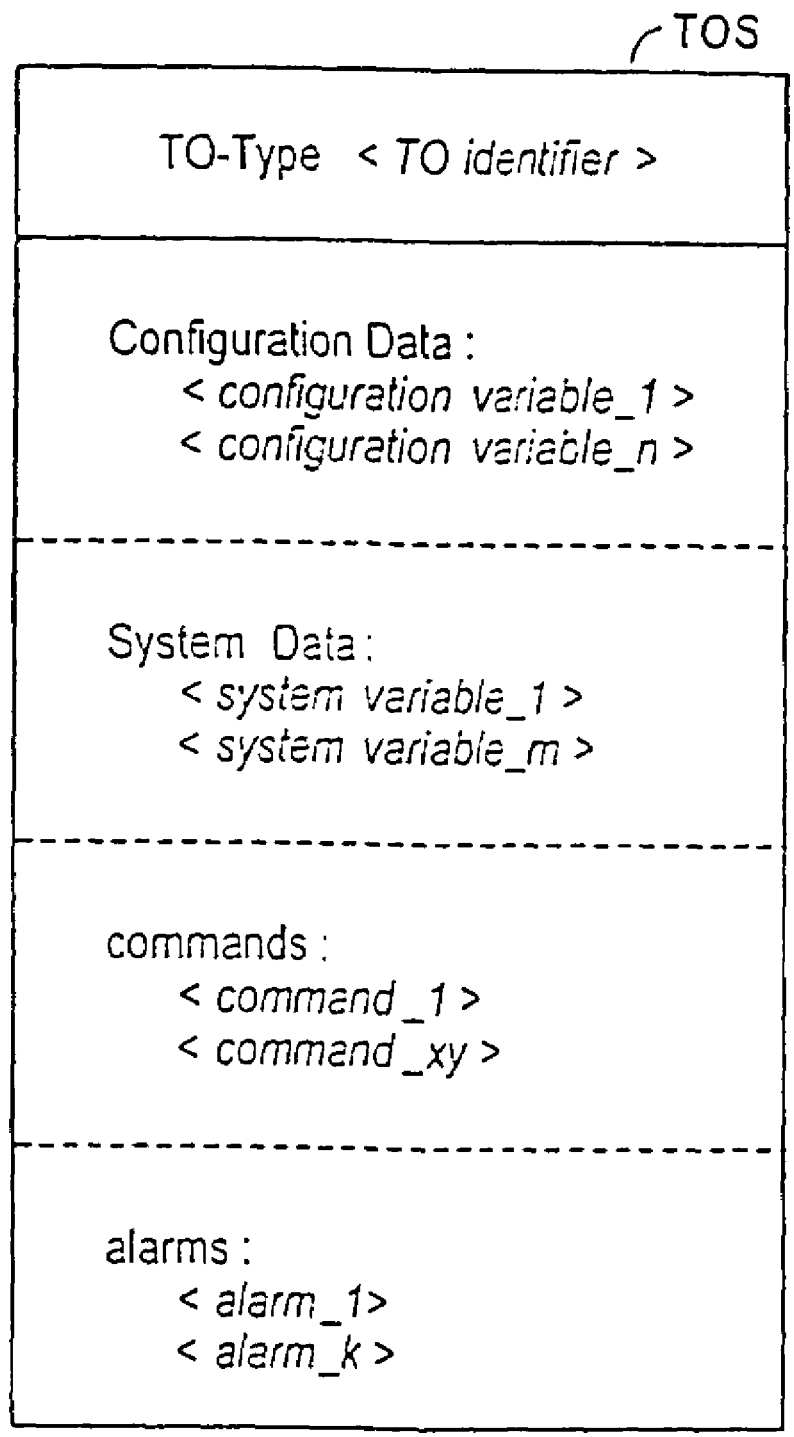
FIG. 3 uses an abstract schematic diagram to show a technical object having a user interface.

FIG. 3 uses an abstract schematic diagram to show the user's view of a technology object, i.e., one instance of a technology object type. This specification of a technology object TOS is shown as a rectangle composed of five parts. The first part at the top, separated from the subsequent parts by a solid line, contains the type of the underlying technology object (TO type) and the TO identifier, i.e., the unique designation of the instantiation within the project. The next part below that contains the configuration data with the configuration variables <configuration variable_1> through <configuration variable_n>. Through the configuration data, the technology objects TO1 through TOn is set in its basic mode of operation. The configuration data is set through the engineering system (ES, FIG. 1) and may optionally be read or written from the user program (PRG1, FIG. 2 and PRG2, PRG3, FIG. 11) by means of access functions.

In FIG. 3, configuration data is separated from the system variables (system data) by a dotted line. The system variables <system variable_1> through <system variable_m> can be altered from the user program (PRG1, FIG. 2 and PRG2, PRG3, FIG. 11) and can be used as program variables. System variables may be readable or read/writable. In addition, the states of technology objects are represented by the system variables. Transitions of state can be triggered by events and/or commands. Technology objects are parameterized by means of configuration data and system variables.

The next section shows the commands, also separated from the system variables by a dotted line. Commands <command_1> through <command_xy> represent functions that can be called up and represent the functionality of a technology object. These functions have defined identifiers, function parameters and local values. In calling up functions, optional parameters may be omitted, and default values used instead. In addition to the technological functionality, however, a technology object also has commands which determine the basic behavior of the technology object, e.g.:

command to reset in a defined starting state;
command to reset specifically a pending error;
commands to set and reset in simulation operation (in simulation operation, the program is run through without any concrete output to the actuators or input from the sensors);
commands to make the technology object active/inactive; and
information functions.

The next section of the specification of a technology object TOS is the alarms. In FIG. 3, alarms are separated from the commands by a dotted line. The diagram according to FIG. 3 contains alarms <alarm_1> through <alarm_k>. A technology object provides for monitoring and can set defined alarms, optionally with alarm information and predefined reactions, in the event of an error. Technological alarms are set or generated on the technology object. Technological alarms have a response which is set for a specific technology object type, e.g., motion stop. The possible reactions are specific for a technology object type and, therefore, are described explicitly for the individual technology object types. In addition, the technological alarms have a technology object type-specific identifier (e.g., an alarm number) and parameter. Thus, they have an adjustable response to program processing (global response) and also permit for each error instance-specific setting and response which is performed on the engineering system (ES, FIG. 1) at startup.

A user can use commands of technology objects synchronously or asynchronously, depending on the setting. Therefore, a command can be written cyclically (customary with a programmable memory) or programmed in an event-controlled manner (customary with motion controllers). In the synchronous mode, the technology object executing a positioning command remains in its state until reaching the positioning goal. In the asynchronous mode, however, the technology object continues to run in its program sequence simultaneously with the execution of the positioning command and may assume other states in doing so. The technology object can be checked by polling, for example, to determine whether the positioning goal has been reached.

Figure 4:
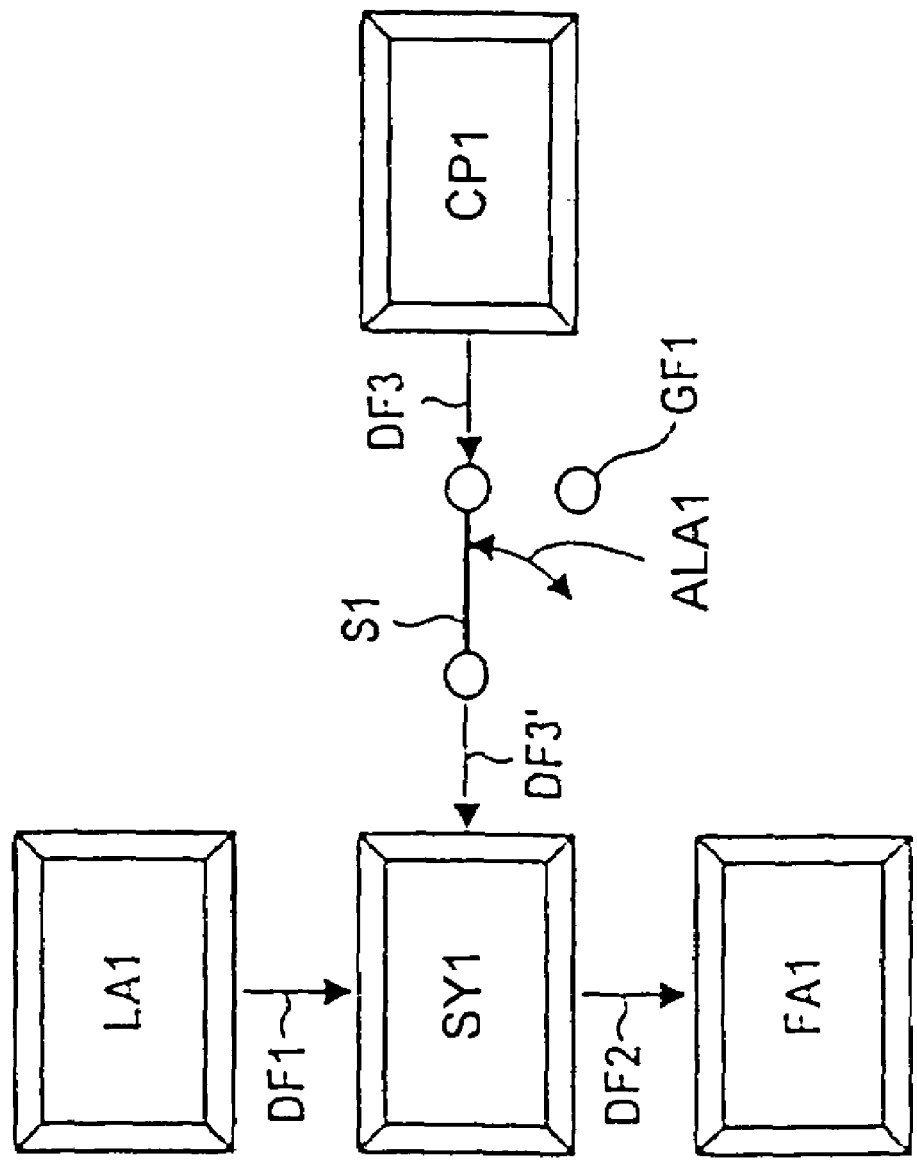
FIG. 4 shows technology objects representing a synchronous interconnection in an interleaving diagram.

FIG. 4 shows an interleaving diagram illustrating the interleaving of the "synchronism" SY1 technology object with other technology objects. The technology objects are shown as rectangles with a double border, where corners belonging together are connected by a line. A synchronous interconnection is created by the interleaving of the "synchronism" SY1 technology object with the "leading axis" LA1, "following axis" FA1 and "cam plate" CP1 technology objects. The technology objects are interleaved by means of data flows DF1 through DF3 or DF3'.

In FIG. 4, the leading value is represented by the "leading axis" LA1 technology object. In addition, FIG. 4 shows that the "leading axis" LA1 technology object specifies the leading value for the "synchronism" SY1 technology object over data flow arrow DF1. The "leading axis" LA1 technology object may represent a positioning axis, for example. However, the leading value can also be preset by means of a virtual axis, i.e., a calculated (not real) axis or by means of external sensors for the "synchronism" SY1 technology object. The "synchronism" SY1 technology object makes available gear synchronization or cam synchronization as the technological functionality, and increasing or decreasing synchronization or master switching can be performed with it. Optionally a gear or a cam may be selected as the law of synchronism on the "synchronism" SY1 technology object. The right part of FIG. 4 shows these selection options. The allocation arrow ALA1 shows that the switch S1 may be connected optionally to a gear, represented by the gear factor GF1, or to the "cam plate" CP1 technology object. In the case of a connection to the "cam plate" CP1 technology object, data flows from this to the "synchronism" SY1 technology object over the data flow arrow DF3, the switch S1 and the data flow arrow DF3'. In the case of a connection to gear factor GF1, data flows to the "synchronism" SY1 technology object over the switch S1 and the data flow arrow DF3'. Over the "cam plate" CP1 technology object, non-linear gear transmission ratios can be set on the "cam plate" CP1 technology object, but linear gear transmission ratios can be set over the gear factor GF1. The "synchronism" SY1 technology object is interleaved with the "following axis" FA1 technology object by the data flow arrow DF2.

FIG. 4, thus, shows the basic configuration of technology objects for implementation of a synchronous functionality and can in turn be regarded and used as a (complex) technology object.

Interleaving of technology objects is defined in the configuration phase (design). In the selection options, they are activated over the user program (PRG1, FIG. 2 and PRG2, PRG3, FIG. 11) in run time, i.e., switching can be programmed during run time. In principle, interleaving makes it possible for more than one "synchronous object" SY1 to be connected to a "following axis" FA1, thereby implementing superposition of synchronous functions. The leading value for the "synchronous object" SY1 can also be preset directly from the user program (PRG1, FIG. 2 and PRG2, PRG3, FIG. 11). In addition, more than one technology object may be configured to supply the leading value. The current interleaving is in turn selected and activated at the run time over commands in the user program (PRG1, FIG. 2 and PRG2, PRG3, FIG. 11). In addition, for the definition of the law of synchronism, it is possible to switch between different technology objects "cam plate" CP1 and/or between different gear factors GF1 by programming online. A "cam plate" CP1 technology object may be allocated to one or more "synchronism" SY1 technology objects. In addition, from one "leading axis" LA1 technology object, it is possible to configure one or more synchronous connections over "synchronism" SY1 technology object.

Figure 5:
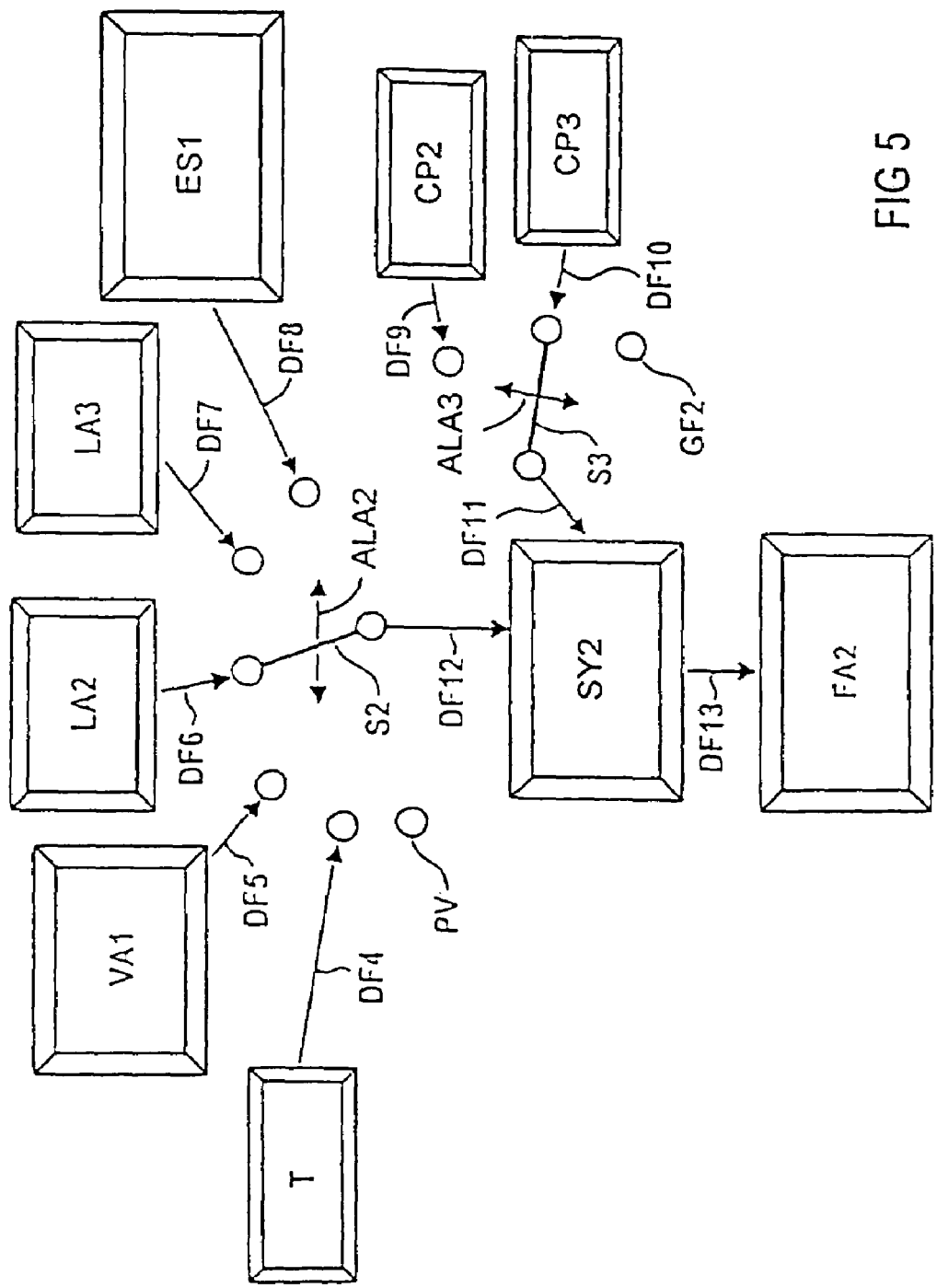
FIG. 5 shows a synchronous interconnection having switching options between different leading value sources and laws of synchronism in an interleaving diagram.

FIG. 5 shows a synchronous interconnection with switching options between different leading value sources and laws of synchronism in an interleaving diagram. In FIG. 5, the technology object "synchronism" SY2 may receive leading values from the technology objects "time" T "virtual axis" VA1, "leading axis" LA2, "leading axis" LA3, "external sensor" ES1 and from a program value PV of the user program (PRG1, FIG. 2 and PRG2, PRG3, FIG. 11). The allocation arrow ALA2 indicates that the switch S2 can establish different leading value connections for the technology object "synchronism" SY2. "Leading value interleaving" for the technology object "synchronism" SY2 is achieved over one of the data flows DF4 through DF8 and over the switch S2 and data flow DF12.

Technology objects "time" T, "virtual axis" VA1, "leading axis" LA2 and LA3, "external sensor" ES1 and the program value PV are the potential masters for the "synchronism" SY2 technology object. Interleaving options are designed, and a designed master can be selected, in run time from the user program (PRG1, FIG. 2 and PRG2, PRG3, FIG. 11). Master switching is possible with this approach. The "virtual axis" technology object VA1 does not represent a real axis but instead is a calculated axis. "Virtual axes" are characterized in that they can be commanded by commands and have a motion guide or interpretation but they do not have a drive or control. However, the "leading axis" LA2 and LA3 technology objects represent real axes. Real axes represent standard axes with a drive, motor, or sensor, so they have a real actuator. The "external sensor" ES1 technology object can also supply a leading value for the "synchronism" SY2 technology object. An "external sensor" ES1 usually does not have an axis and supplies the information in a designable format. "External sensors" may be, for example, angle sensors on a press. Leading values for the SY2 technology object can also be supplied by the "time" T technology object and by the program value PV. A "time" technology object supplies a leading value in the form of a time value or a time factor, and a program value PV can be designed as the leading value in the user program (PRG1, FIG. 2 and PRG2, PRG3, FIG. 11). Technology objects are shown in this figure in the usual notation.

FIG. 5 shows that a gear factor GF2 or the "cam plate" CP2 and CP3 technology objects may optionally be selected as the laws of synchronism for the "synchronism" SY2 technology object. The allocation arrow ALA3 shows that the switch S3 can optionally be set between the technology objects CP2, CP3 and the gear factor GF2. The "gear interleaving" with the technology object "synchronism" SY1 then takes place over data flow arrows DF9, DF10, the set switch S3 and data flow arrow DF11. Switch connections S2 and S3 can be programmed in the user program (PRG1, FIG. 2 and PRG2, PRG3, FIG. 11). The "synchronism" SY2 technology object is connected to the "following axis" FA2 technology object over the data flow arrow DF 13. Thus, in the design, "synchronism" SY2 technology object is interleaved at the slave end with "following axis" FA2 technology object, which may represent a synchronous axis, for example. At the master end, the "synchronism" SY2 technology object is interleaved with a technology object that supplies a leading value. This leading value can also be specified directly from the user program (PRG1, FIG. 2 and PRG2, PRG3, FIG. 11). Thus, more than one technology object can be configured for supplying a leading value; the current interleaving is selected in run time over commands in the user program.

Figure 6:
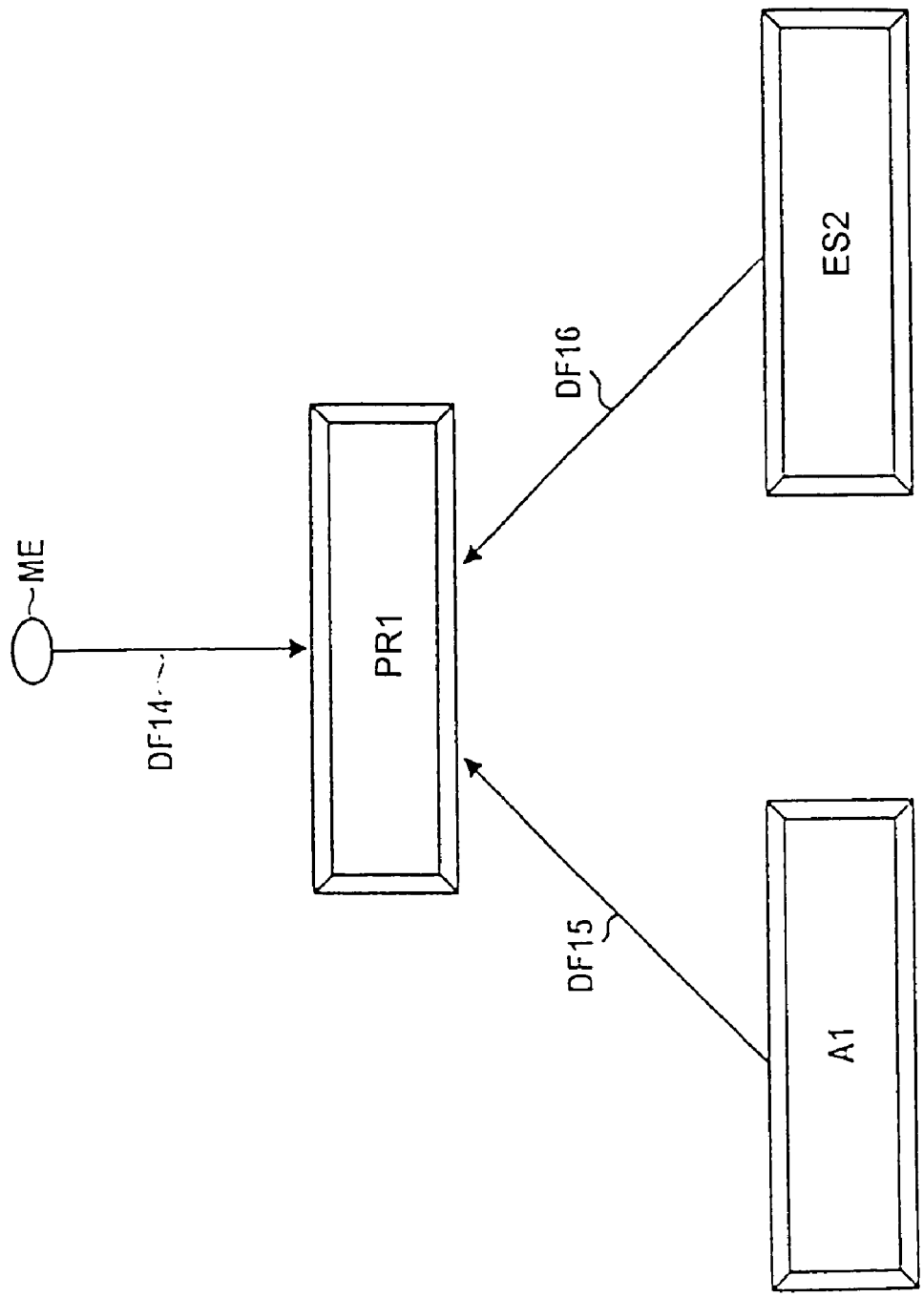
FIG. 6 shows the interleaving of the probe as a technology object in an interleaving diagram.

FIG. 6 shows interleaving of the "probe" PR1 technology object. Technology objects are shown here in the usual notation. The "probe" PR1 technology object supplies the functionality for performing a measurement task. For the functions on the "probe" PR1 technology object, measurement tasks can be activated and parameterized. The measured value is sent over the measurement input ME and data flow arrow DF14 to the "probe" PR1 technology object. The measurement input ME is shown as an ellipse. One measurement input ME can be interleaved with a plurality of "probes" technology objects. These "probes" technology objects can also be activated at the same time. One measurement input ME usually corresponds to one hardware measurement input that is assigned to the "probe" PR1 technology object by the configuration. In addition, the "probe" PR1 technology object is interleaved with at least one technology object that supplies a measured value (e.g., position). In FIG. 6, the "probe" PR1 technology object is interleaved with the "axis" A1 and "external sensor" ES2 technology objects over the data flow arrows DF15 and DF16. The "axis" A1 technology object may be a positioning axis or a synchronous axis. A technology object that supplies a measured value may be interleaved with a plurality of "probe" technology objects.

Figure 7:
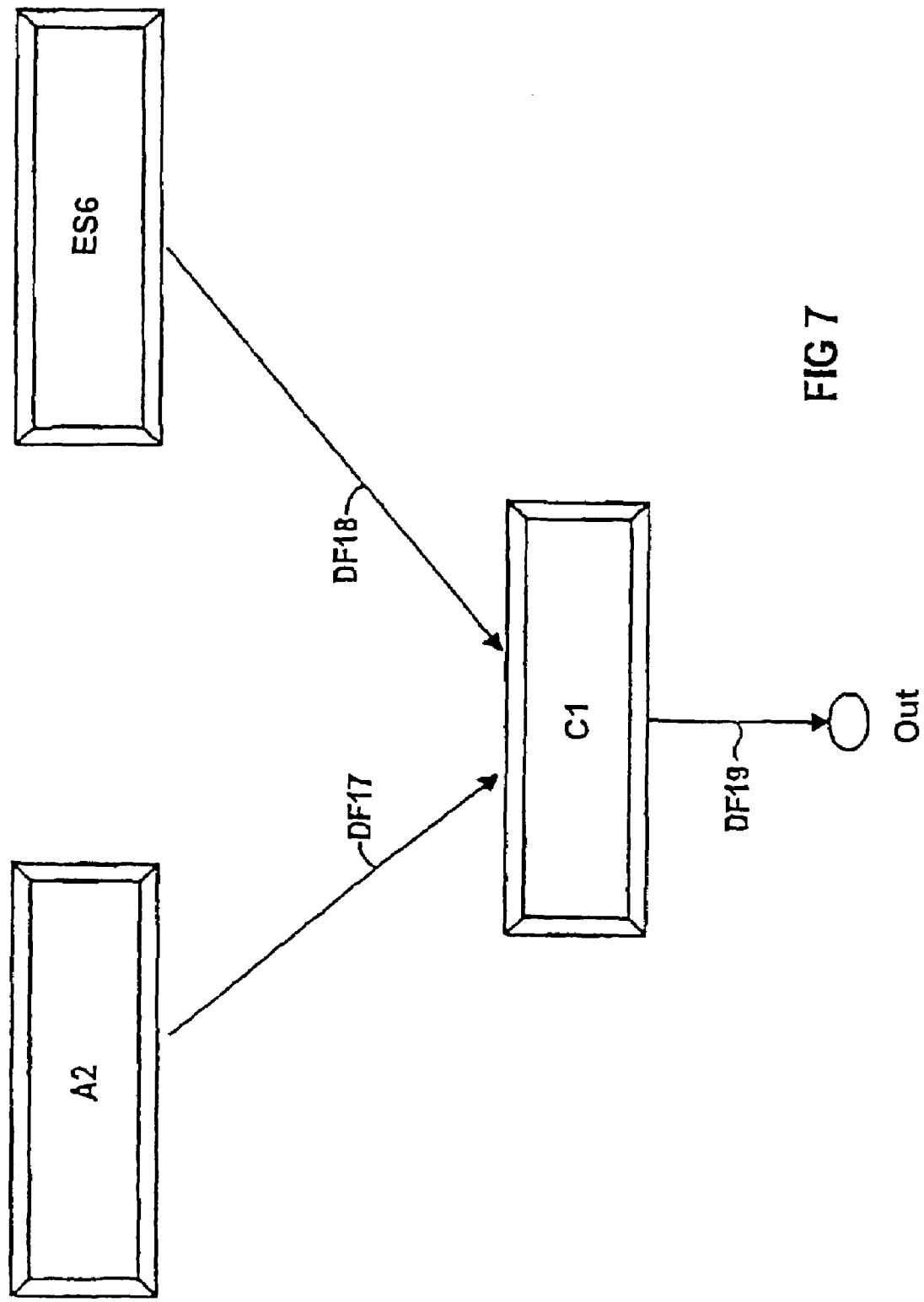
FIG. 7 shows the interleaving of the cam as a technology object.

FIG. 7 shows in an interleaving diagram the "cam" C1 technology object interleaved with the "axis" A2 and "external sensor" ES3 technology objects. The "axis" A2 technology object is interleaved with the "cam" C1 technology object over the data flow arrow DF17, and the "external sensor" ES3 technology object is interleaved with the "cam" C1 technology object over the data flow arrow DF18. The "cam" C1 technology object is interleaved with the output Out over data flow arrow DF19, the output "Out" being shown as an ellipse. The "cam" C1 technology object supplies the functionality for calculating cam switching values. Cam functions can be activated and parameterized via the functions on the "cam" C1 technology object. The "axis" A2 and "external sensor" ES3 technology objects supply reference values for the "cam" C1 technology object. The allocation of these technology objects to the "cam" C1 technology object is designed by the user. The user also designs the allocation of the "cam" C1 technology object to an output Out, and an allocation to internal variables is also possible. For a current application, the "cam" C1 technology object is interleaved with exactly one technology object, which supplies the reference value.

A reference value is, for example, an axial position. The "axis" A2 technology object here may represent, for example, a positioning axis or a synchronous axis. It is, thus, possible for an allocation of the "cam" C1 technology object to an output Out to be omitted, and then the "cam" C1 technology object acts only on system variables of the technology object (e.g., for the use of the technology object as an internal cam). The technology object supplying the reference value may also be interleaved with a plurality of technology objects as cams at the same time. Technology objects are shown here in the usual notation.

Figure 8:
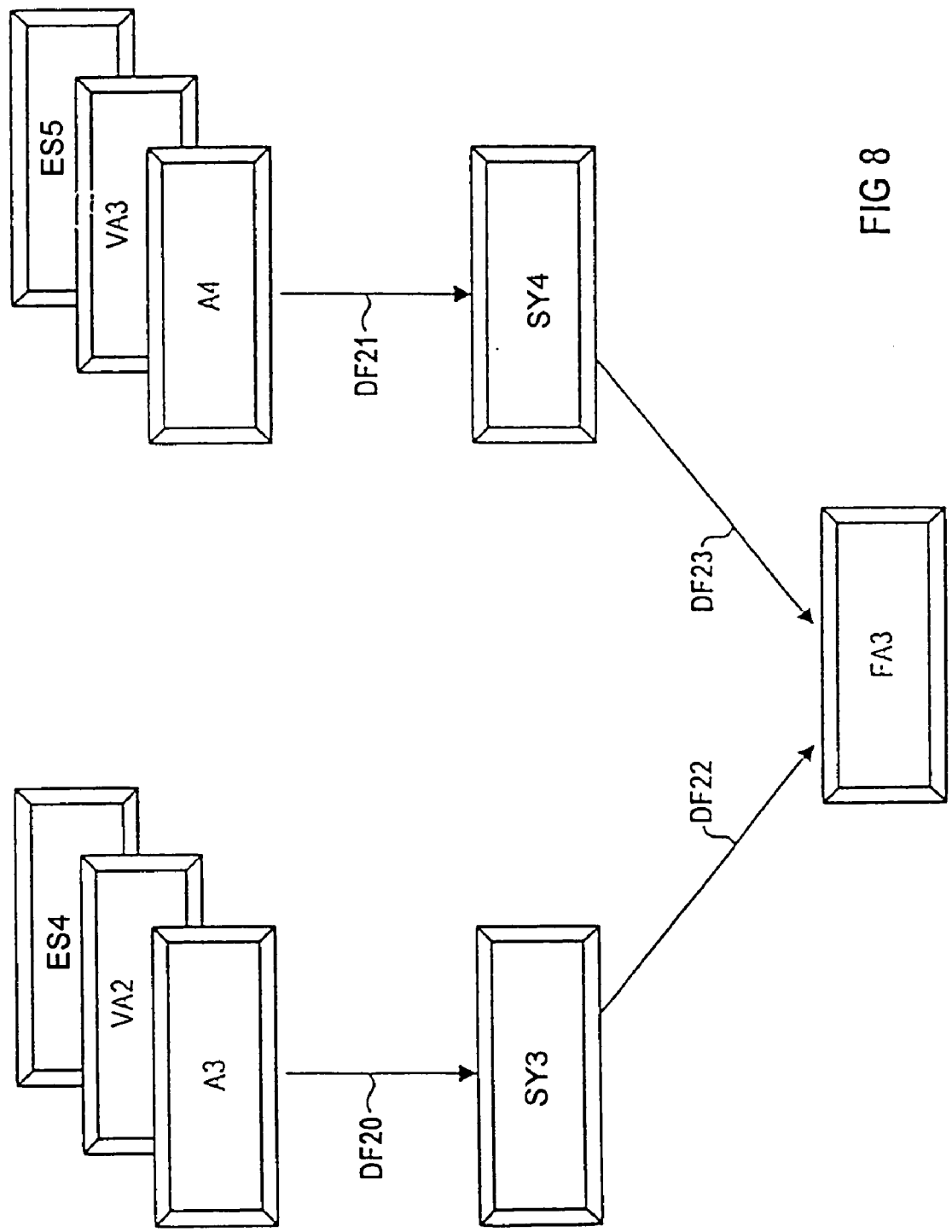
FIG. 8 shows interleaving with synchronous technology objects in an interleaving diagram.

FIG. 8 shows that a "following axis" FA3 technology object may be interleaved with a plurality of "synchronism" SY3 and SY4 technology objects. The "following axis" FA3 technology object is interleaved with the "synchronism" SY3 technology object over the data flow arrow DF22 and with the "synchronism" SY4 technology object over the data flow arrow DF23. The "synchronism" SY3 and SY4 technology objects receive their leading value inputs over data flow arrows DF20 and DF21. FIG. 8 shows that the leading values for the respective synchronous interconnection may be supplied over different technology objects. Thus, for example, the "axis" A3 technology object, "virtual axis" VA2 technology object, or "external sensor" ES4 technology object can supply the leading value for synchronous object SY3. Accordingly, the leading value for the "synchronous object" SY4 can be supplied by the "axis" A4, "virtual axis" VA3, or "external sensor" ES5 technology objects, for example. Then in FIG. 8, the "synchronism" SY4, "following axis" FA3, and "axis" A4 technology objects, for example, form a synchronous interconnection. The desired interleaving in each case is designed by the user, and a designed master (the master supplies the leading value for the synchronous interconnection) can be selected in run time from the user program, so that master switching is possible. The "following axis" FA3 technology object in FIG. 8 is the slave in the synchronous interconnection. Technology objects are shown here in the usual notation.

Figure 9:
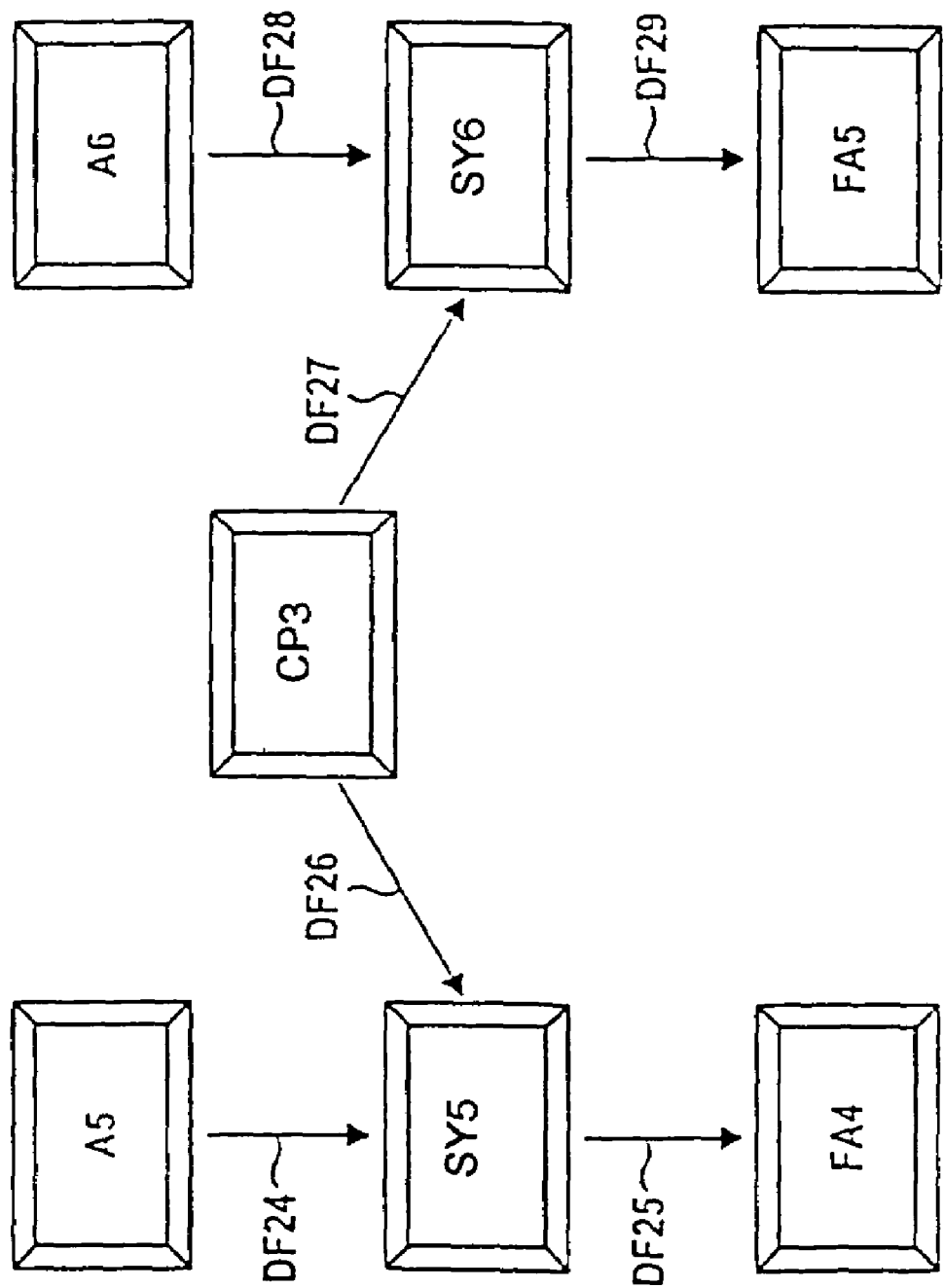
FIG. 9 shows the allocation of a cam plate as a technology object to multiple synchronous objects in an interleaving diagram.

FIG. 9 shows an interleaving diagram in which the "cam plate" CP3 technology object supplies the gear law for two "synchronous objects" SY5 and SY6 over data flow arrows DF26 and DF27. Thus, FIG. 9 shows two synchronous interconnections, each being supplied with a common gear law by the same "cam plate" CP3 technology object. The two synchronous interconnections are arranged at the right and left of the "cam plate" CP3 technology object. The left synchronous interconnection is formed by the "axis" A5 technology object which supplies the leading value and, thus, functions as the leading axis. This may be a positioning axis of a synchronous axis, for example. The "axis" A5 technology object is connected to the "synchronism object" SY5 technology object by the data flow arrow DF24. The leading value is supplied over this data flow arrow DF24. On the slave side, the "synchronism" SY5 technology object is connected to the "following axis" FA4 technology object by the data flow arrow DF25.

The right synchronous interconnection is formed by the "axis" A6, "synchronism" SY6, and "following axis" FA5 technology objects. The "axis" A6 here corresponds to the leading axis and the "following axis" FA5 is a slave axis. Interleaving here takes place over data flow arrows DF28 and DF29. In addition, it is possible for one or more synchronous connections over synchronous objects to be configured from one leading axis. "Cam plates" technology objects can be allocated to one or more synchronous objects. Assembly of the synchronous interconnection is designed by the user. Designed synchronous interconnections may in turn be represented as technology objects and their functionality may also be used in other applications. Technology objects are shown here in the usual notation.

Figure 10:
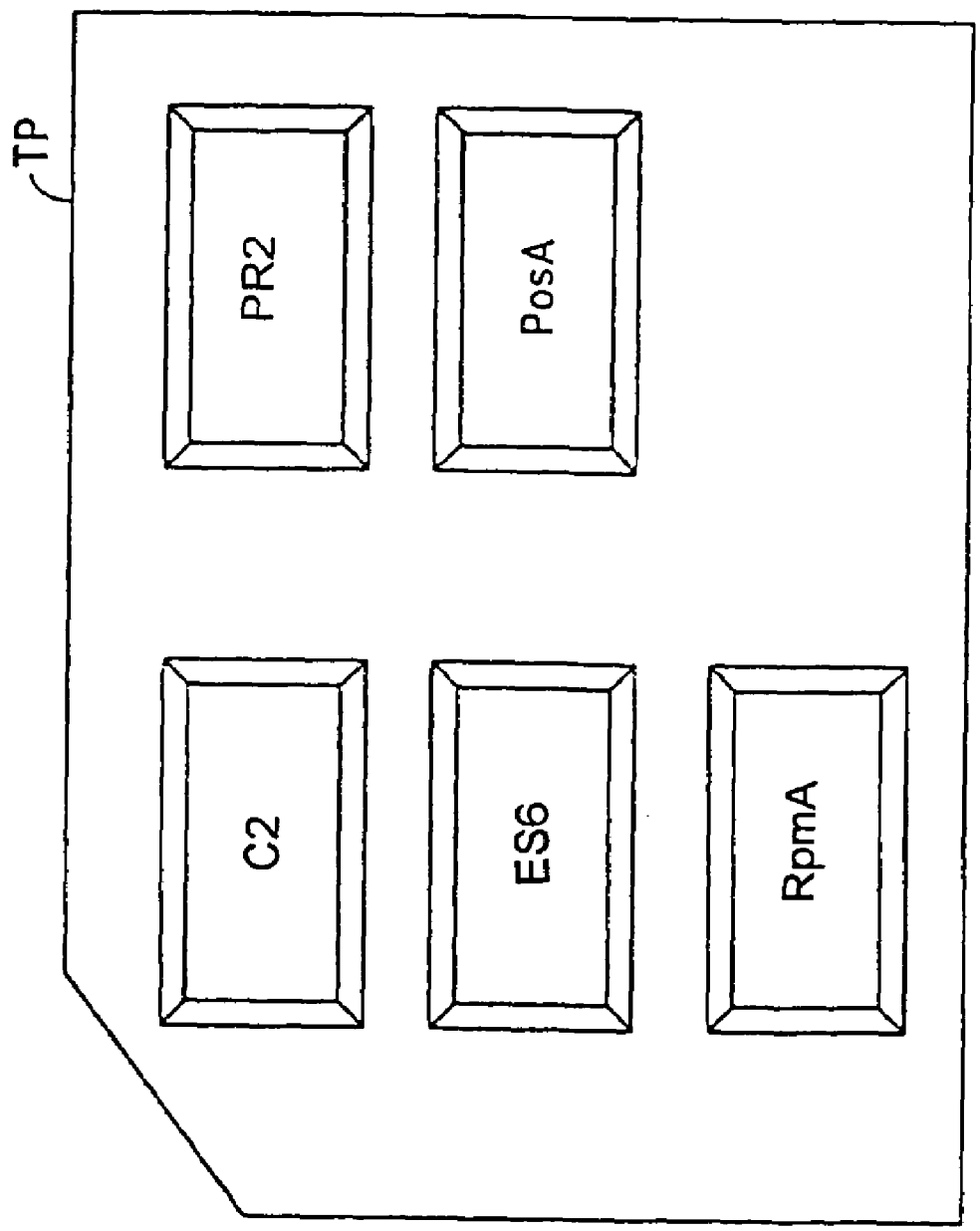
FIG. 10 shows the clustering of technology object types to form one technology package in a survey diagram.

FIG. 10 shows how several technology objects may be clustered to form one technology package TP. Technology package TP is shown as a rectangle, with the upper left corner clipped. Technology package TP contains the technology objects "cam" C2, "external sensor" ES6, "rotational speed axis" RpmA, "probe" PR2 and "positioning axis" PosA. Technology objects are shown here in the usual notation. Technology objects here do not represent any instances, but instead are technology object types. A technology package TP, thus, contains a collection of technology object types representing certain functionalities. Loading technology objects into the run time system of the controller and, thus, the functional expansion of the controller, take place through technology packages. A user can load certain technology packages TP, which in turn contain technology object types, into the run time system (RTS4, RTS5 of FIG. 2) and can thus achieve technology scaling of the functionality of the controller. In addition, a functional structuring can be achieved through the technology package TP with appropriate allocation of technology object types.

Figure 11:
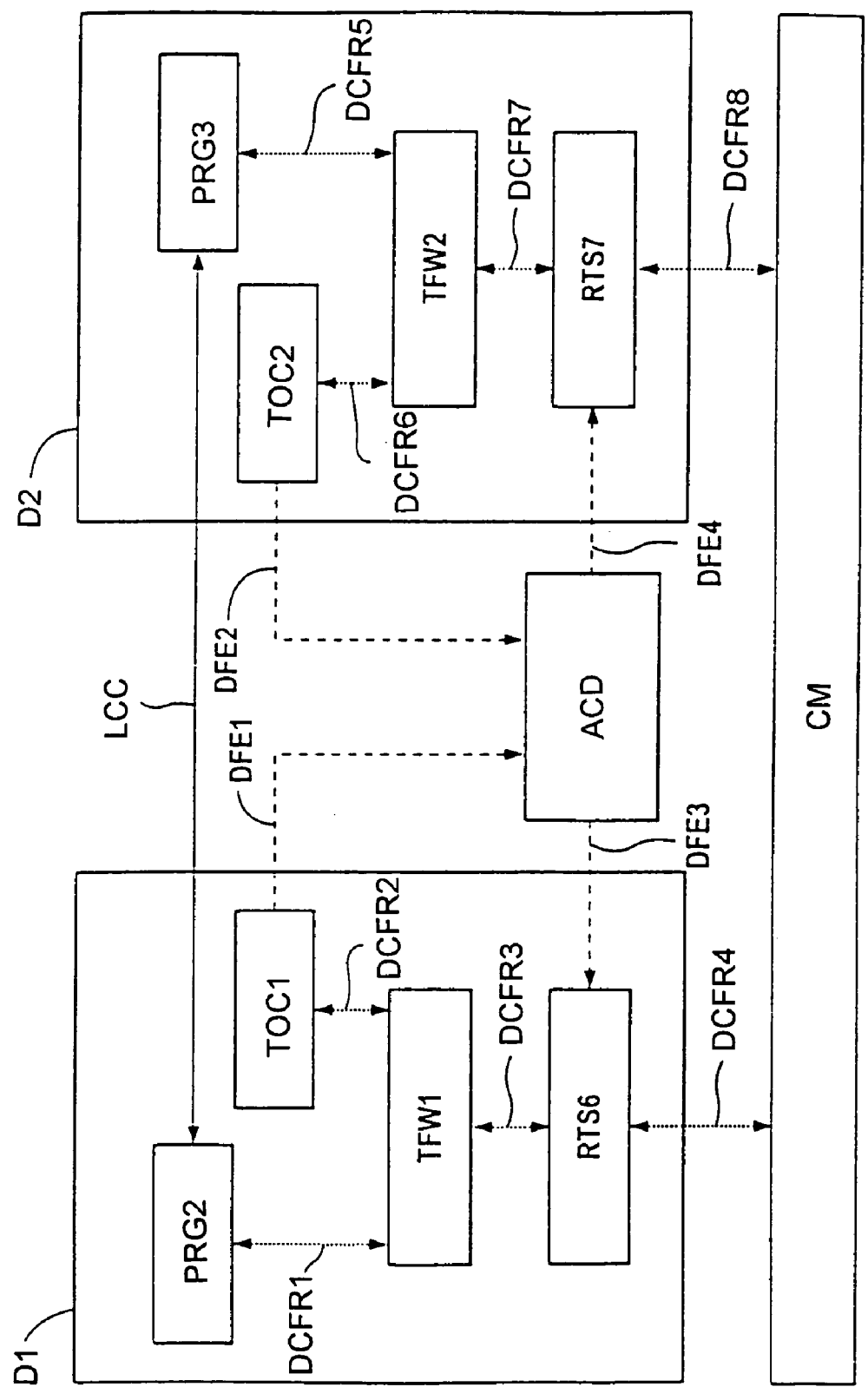
FIG. 11 shows the communication structure between two devices in a survey diagram.

The survey diagram in FIG. 11 shows communication structure between two devices D1 and D2. In this context, a device indicates a hardware element with a CPU. Technological functionality is distributed in the form of technology objects among devices on which they ultimately will run. In terms of software, the devices D1 and D2 are represented as so-called system technology objects (system TO). A system TO cannot be relocated because it is fixedly connected to one device. In a system TO, the functionality of the respective device is encapsulated. System TOs represent the device functionality, while technology objects represent the technological functionality.

Devices D1 and D2 are shown as rectangles in the right and left halves of the drawing in FIG. 11. Devices D1 and D2 each contain a user program PRG2 and PRG3, TO configurations TOC1 and TOC2, technological firmware TFW1 and TFW2 and a run time system RTS6 and RTS7, with all these subelements being represented by rectangles. User programs PRG2 and PRG3 contain the commands created by the user to control the technological process (P, FIG. 1), e.g., positioning commands and/or motion commands in the case of motion controllers. The technological firmware TFW1 and TFW2 represents the technological functionality by which the basic system (UMC-K, FIG. 2) of the run time systems RTS6 and RTS7 have been expanded. Technological firmware TFW1 and TFW2 contain the loaded technology object types whose instances can be used by a user in his user programs PRG2 and PRG3. TO configurations TOC1 and TOC2 contain configuration information from the technology objects (e.g., interleaving and distribution information). The configurations are done in the engineering system (ES, FIG. 1). The user programs ultimately run in the run time systems RTS6 and RTS7. Run time systems RTS6 and RTS7 correspond to an operating system and are responsible for memory management and computing time management. For reasons of simplicity, no other content elements of devices D1 and D2 are shown here.

The communications medium CM is shown as an elongated rectangle in the lower half of the drawing. The communications medium CM may be a bus connection, for example.

Automatic communications design ACD is also shown as a rectangle between devices D1 and D2. Automatic communications design ACD is usually software that runs as part of the engineering system (ES, FIG. 1) and supplies run time systems RTS6 and RTS7 with the generated communications information (e.g., who is communicating with whom? How is the communication taking place?).

Bidirectional arrow LCC between user programs PRG2 and PRG3 represents a logical communication channel between user programs PRG2 and PRG3. The user here sees only his technology objects, which he is using in his own user programs, and he can abstract their physical location from this.

Unidirectional arrows DFE1 through DFE4, shown with dotted lines, represent data flow at engineering time. Automatic communications design ACD is supplied with communications information on the technology objects (e.g., distribution and interleaving information) from the TO configurations TOC1 and TOC2 over data flows DFE1 and DFE2. Automatic communications design ACD sends the communication channels generated from this on to run time systems RTS6 and RTS7 of devices D1 and D2 over data flows DFE3 and DFE4. All these devices are, thus, supplied with routing information by the automatic communications design ACD so that each device can communicate with each other device according to the abstract description of the configuration and communication defined in the TO configurations TOC1 and TOC2. To generate the communication channels, the automatic communications design ACD uses global project variables with which the user can define, for example, the quality demands.

Automatic communications design ACD permits efficient utilization of the device and network topology because it even images abstract quality demands (e.g., broadcast, clock synchronicity, transmission times) optimally on device properties and properties of the communications medium CM (e.g., a Profibus). In the case of configuration of technology objects, a user need not be concerned about how the communication ultimately takes place physically.

Vertical bidirectional arrows DCFR1 through DCFR8, shown with dotted lines, represent the data flow and control flow in run time, e.g., if devices D1 and D2 themselves are connected to the communications medium CM (the communications medium may be a Profibus, for example, and are running and in operation. There is a "sharp" data flow and control flow from user programs PRG2 and PRG3 through technological firmware TFW1 and TFW2 through the run time system RTS6 and RTS7 to the communications medium CM, over the communications medium CM to the next device and back again to the user program. Of course, in "sharp operation" of a device, information of the TO configurations TOC1 and TOC2 is needed.

What is claimed is:
1. An industrial controller comprising a plurality of devices, for use in controlling a system including a plurality of components, the controller comprising:
   a) a plurality of technology objects corresponding to the components, at least one technology object of the plurality of technology objects comprising:
      a technological functionality independent of the plurality of devices of the industrial controller and a device functionality dependent on at least one of the plurality of devices, wherein the technological functionality does not depend on the device functionality, and
      at least one command that in part characterizes the at least one technology object and determines behavior of the at least one technology object;
   b) control means independent of the controlled components; and
   c) component control means relating to the controlled components for supplementing the control means, the component control means implemented using the at least one technology object, the at least one technology object distributable on the plurality of devices and including a capability to execute commands that control the devices.
2. An industrial controller according to claim 1, further comprising automatically generated communication links between at least two of the technology objects.
3. An industrial controller according to claim 2, wherein technology objects comprise attributes taken into account in the generation of the communications links.
4. An industrial controller according to claim 1, wherein technology objects are distributable on a plurality of devices within a project, the project relating to plurality of control units.
5. An industrial controller according to claim 1, wherein the functionality of the technology objects is distributed among control units in equidistant communication with one another in real time with clock synchronization.
6. An industrial controller according to claim 1, wherein the technology object types permit technological scaling of the functionality of the controller.
7. An industrial controller according to claim 1, wherein technology objects are interleaved to form container objects.
8. An industrial controller according to claim 1, further adapted to provide a plurality of views of the technology objects to a user.
9. An industrial controller according to claim 1, further adapted for feedback-free programming of a technology object with respect to the other technology objects and the control means.
10. An industrial controller according to claim 1, wherein technology objects are represented in the engineering system by graphical elements.
11. An industrial controller according to claim 1, wherein the technology objects have types and the technology object types are clustered into one or more technology packages.
12. A method of programming an industrial control system comprising a plurality of devices, the control system being technology neutral and programmed for one or more projects and comprising a plurality of technology objects, the method comprising the steps of:
   a) interleaving of the technology objects to form a set of complex technology objects;
   b) distributing a plurality of the technology objects on a plurality of the control system devices for a first project; and c) reusing at least one of the complex technology objects in a second project;
wherein at least one technology object of the plurality of technology objects comprises
a technological functionality independent of the plurality of devices of the industrial control system and a device functionality dependent on at least one of the plurality of devices, the technological functionality also being independent of the device functionality;
at least one command that in part characterizes the at least one technology object and determines the behavior of the at least one technology object, and
a capability to execute commands that control the plurality of devices.

13. A method according to claim 12, further comprising communications channels between at least two of the technology objects, wherein attributes of the technology objects are taken into account in generating the communication channels.

14. A method of programming an industrial control system comprising a plurality of devices, the control system being technology neutral and programmed for one or more projects and comprising a plurality of technology objects, the method comprising the steps of:
a) instantiating the technology objects;
b) interleaving the technology objects to form a set of complex technology objects for a first project;
c) distributing the technology objects on a plurality of the devices;
d) generating communication channels between the technology objects; and
e) reusing at least one of the complex technology objects in a second project;
wherein at least one technology object of the plurality of technology objects comprises
a technological functionality independent of the plurality of devices of the industrial control system and a device functionality dependent on at least one of the plurality of devices, the technological functionality also being independent of the device functionality;
at least one command that in part characterizes the at least one technology object and determines the behavior of the at least one technology object; and
a capability to execute commands that control the plurality of devices.

15. A method for programming an industrial controller for a technical process, the method comprising the steps of:
a) selecting a plurality of technology objects relevant to a desired application;
b) interleaving the selected technology objects to form technology objects having complex functionality; and
c) distributing the interleaved technology objects onto a plurality of devices;
wherein at least one technology object of the plurality of technology objects comprises
a technological functionality independent of the plurality of devices and a device functionality dependent on at least one of the plurality of devices, the technological functionality also being independent of the device functionality;
at least one command that in part characterizes the at least one technology object and determines the behavior of the at least one technology object, and
a capability to execute commands that control the plurality of devices.

16. The method of claim 15, wherein interleaved technology objects may be re-used in a subsequent application of the method.

17. A system for programming an industrial controller, comprising:
a) an industrial control system;
b) means for selecting a plurality of technology objects relevant to a desired application;
c) means for interleaving the selected technology objects to form technology objects having complex functionality; and
d) means for distributing the interleaved technology objects onto a plurality of devices;
wherein at least one technology object of the plurality of technology objects comprises
a technological functionality independent of the plurality of devices and a device functionality dependent on at least one of the plurality of devices, the technological functionality being independent of the device functionality;
at least one command that in part characterizes the at least one technology object and determines the behavior of the at least one technology object; and
a capability to execute commands that control the plurality of devices.

* * * * *

UNITED STATES PATENT AND TRADEMARK OFFICE
CERTIFICATE OF CORRECTION

PATENT NO.         : 7,117,049 B2                                        Page 1 of 1
APPLICATION NO.    : 09/896776
DATED              : October 3, 2006
INVENTOR(S)        : Horn et al.

It is certified that error appears in the above-identified patent and that said Letters Patent is hereby corrected as shown below:

Title page, Assignee at INID Code (73):
Assignee name should read --Siemens Aktiengesellschaft--

Title page, References Cited, at INID Code (56)
Under "Other Publications", add:
--Object-Oriented Software Components and Containers, Process/Industrial Instruments and Controls Handbook, pp. 3.24-3.25, 1999.--

Signed and Sealed this

Fifteenth Day of April, 2008

JON W. DUDAS
*Director of the United States Patent and Trademark Office*